United States Patent [19]
Frech et al.

[11] Patent Number: 5,601,796
[45] Date of Patent: Feb. 11, 1997

[54] METHOD OF MAKING SPINEL LI2MN2O4 COMPOUND

[75] Inventors: Roger E. Frech; Weiwei Huang, both of Norman, Okla.

[73] Assignee: The Board of Regents of the University of Oklahoma, Norman, Okla.

[21] Appl. No.: 561,778

[22] Filed: Nov. 22, 1995

[51] Int. Cl.$^6$ ................................................. C01G 45/12
[52] U.S. Cl. .................................... 423/599; 429/224
[58] Field of Search ............................ 423/599; 429/224

[56] References Cited

U.S. PATENT DOCUMENTS

| | | | |
|---|---|---|---|
| 4,246,253 | 1/1981 | Hunter | 423/605 |
| 4,541,172 | 9/1985 | Evans | 29/623.1 |
| 4,662,065 | 5/1987 | Marincic et al. | 29/623.1 |
| 4,948,484 | 8/1990 | Andersen | 204/105 M |
| 4,956,248 | 9/1990 | Furukawa et al. | 429/194 |
| 4,975,346 | 12/1990 | Lecerf et al. | 429/197 |
| 5,084,366 | 1/1992 | Toyoguchi | 429/224 |
| 5,135,732 | 8/1992 | Barboux et al. | 423/593 |
| 5,192,629 | 3/1993 | Guyomard et al. | 429/197 |
| 5,196,279 | 3/1993 | Tarascon | 429/194 |
| 5,240,794 | 8/1993 | Thackeray et al. | 429/224 |
| 5,266,299 | 11/1993 | Tarascon | 423/599 |
| 5,278,000 | 1/1994 | Huang et al. | 429/91 |
| 5,294,499 | 3/1994 | Furukawa et al. | 429/164 |
| 5,312,457 | 5/1994 | Andersen et al. | 29/623.1 |
| 5,316,875 | 5/1994 | Murai et al. | 429/194 |
| 5,316,877 | 5/1994 | Thackeray et al. | 429/197 |
| 5,370,948 | 12/1994 | Hasegawa et al. | 429/223 |
| 5,370,949 | 12/1994 | Davidson et al. | 429/224 |
| 5,401,599 | 3/1995 | Tahara et al. | 429/218 |
| 5,418,090 | 5/1995 | Koksbang et al. | 429/224 |
| 5,424,146 | 6/1995 | Lin | 429/84 |
| 5,425,932 | 6/1995 | Tarascon | 423/599 |
| 5,427,874 | 6/1995 | Sugeno | 429/194 |
| 5,506,078 | 4/1996 | Davidson et al. | 429/224 |

OTHER PUBLICATIONS

"Lithium Intercalation from Aqueous Solutions", by Li, McKinnon and Dahn, *J. Electrochem Soc.*, vol. 141, No. 9, Sep. 1994 ©The Electrochemical Society, Inc., pp. 2310–2315.

*Primary Examiner*—Wayne Langel
*Attorney, Agent, or Firm*—Dunlap & Codding, P.C.

[57] ABSTRACT

A method of producing spinel $Li_2Mn_2O_4$ from $LiMn_2O_4$, lithium metal and graphite. A mixture of black $LiMn_2O_4$, lithium metal and carbon powders is prepared at a 1:1 molar ratio of Li to $LiMn_2O_4$ and a 1:9 weight ratio of carbon to $LiMn_2O_4$. Then, the mixture is heated at a temperature between 170° C. and 200° C. until spinel $Li_2Mn_2O_4$ is produced. Alternatively, Li and carbon may be reacted together to produce $LiC_6$ or $LiC_{12}$. Then the $LiC_x$ may be mixed and heated with $LiMn_2O_4$ to produce spinel $Li_2Mn_2O_4$.

17 Claims, 6 Drawing Sheets

---

Mix Lithium metal, a material capable of acting as a host for Lithium intercalation, and $LiMn_2O_4$ powders — 2.1

↓

Powder mixture
Heat at a temperature between 170°C and 400°C for a period effective to produce spinel $Li_2Mn_2O_4$ — 2.2

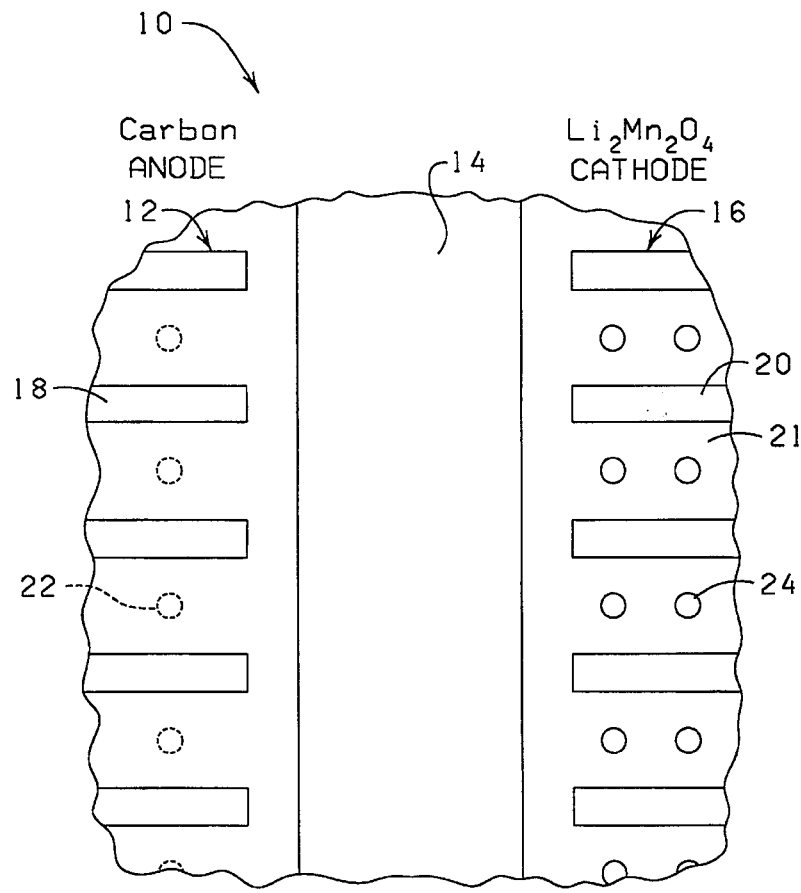

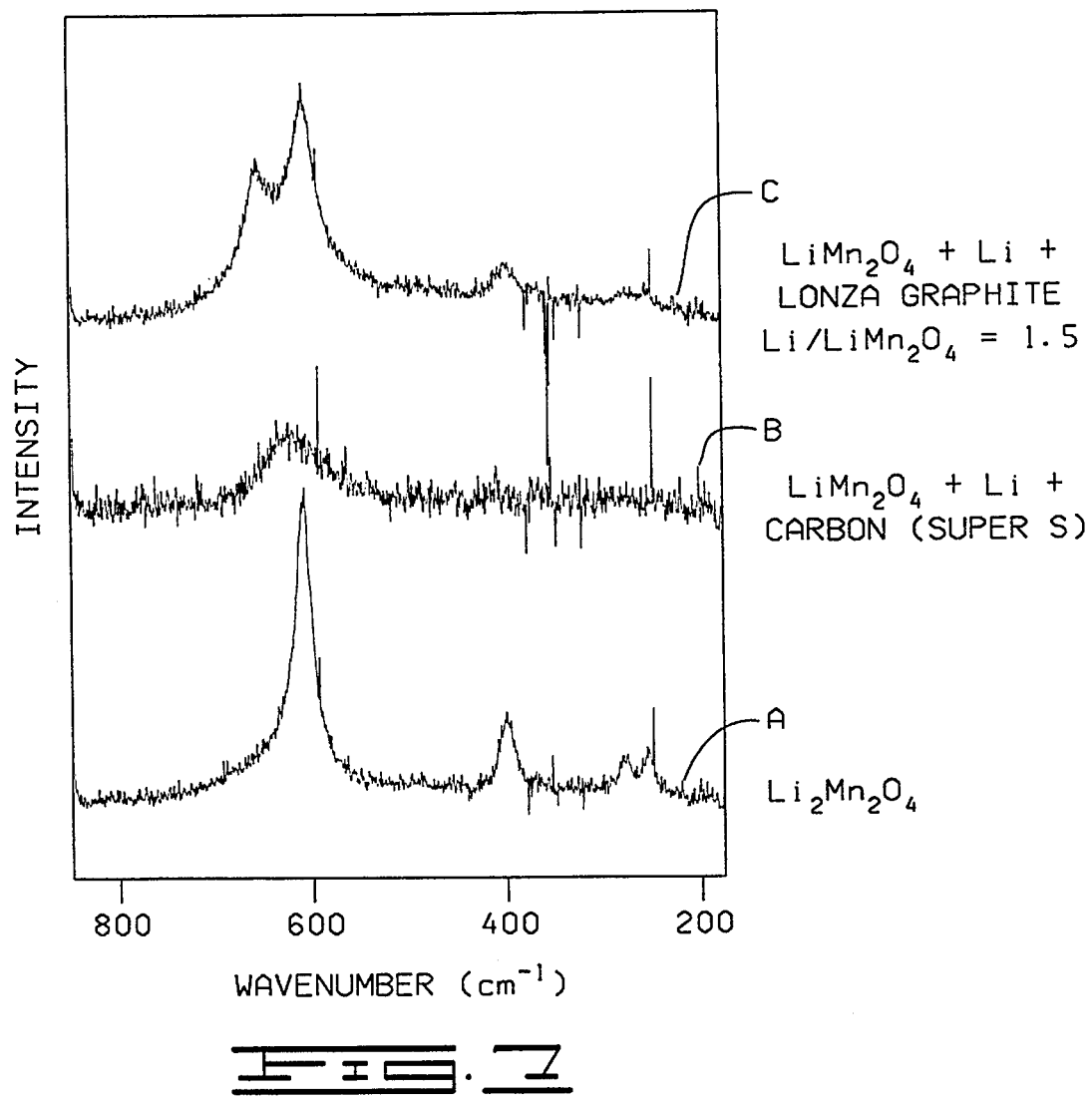

★ — $Li_2Mn_2O_4$
■ — $LiMn_2O_4$
● — GRAPHITE

METHOD OF MAKING SPINEL LI2MN2O4 COMPOUND

BACKGROUND OF THE INVENTION

1. Field of the Invention

The present invention relates generally to methods of producing spinel $Li_2Mn_2O_4$, and particularly, but not by way of limitation, to methods of producing spinel $Li_2Mn_2O_4$ for use as a cathode material in rechargeable lithium batteries.

2. Description of Related Art

Various types of rechargeable batteries are known in the art. One such family of rechargeable batteries is the familiar nickel-cadmium (ni-cad) battery and another such family of rechargeable batteries is the nickel-metal-hydride battery. Yet another family of rechargeable batteries utilize an anode fabricated of carbon in conjunction with a cathode fabricated of a lithium based composition, such as $LiCoO_2$, $LiNiO_2$ or spinel $Li_2Mn_2O_4$. Because the batteries utilizing the lithium based compositions have a high discharge voltage of about 4 volts and thus an energy density about twice that of the nickel-cadmium or the nickel-metal-hydride batteries, the batteries utilizing the lithium based composition represent the state of the art in small-size rechargeable batteries. New and improved rechargeable batteries are constantly being sought, thus, the prior art is replete with lithium based compositions wherein the compositions are produced in various ways.

As an example, U.S. Pat. No. 5,196,279 issued to Tarascon discloses a method of producing spinel $Li_2Mn_2O_4$ wherein $LiMn_2O_4$ is reacted with LiI at low temperatures, or by refluxing $LiMn_2O_4$ in an acetonitrile solution of LiI.

As another example, *Lithium Intercalation from Aqueous Solutions*, J. Electrochem. Soc., Vol. 141, No. 9, September 1994, page 2310, authored by W. Li, W. R. McKinnon and J. R. Dahn discloses a method of producing spinel $Li_2Mn_2O_4$ in an aqueous LiOH electrolyte, or by reacting LiOH with $LiMn_2O_4$ in a solid-state reaction.

Although spinel $Li_2Mn_2O_4$ cathodes formulated in accordance with the work described by W. Li, W. R. McKinnon, J. R. Dahn, Tarascon and others have generally exhibited the desired physical qualities of a high discharge voltage and thus a high energy density, new and improved methods of producing spinel $Li_2Mn_2O_4$ are desired which do not require the use of solvents or the use of relatively expensive compounds. It is to such an improved method for producing spinel $Li_2Mn_2O_4$ that the present invention is directed.

SUMMARY OF THE INVENTION

In accordance with the present invention, spinel $Li_2Mn_2O_4$ is produced having the desired physical qualities of a high discharge voltage and thus a high energy density without the use of solvents or relatively expensive compounds.

Broadly, spinel $Li_2Mn_2O_4$ is produced by mixing effective amounts of Li, $LiMn_2O_4$, and a material capable of acting as a host for Li intercalation to form a mixture containing a molar ratio ranging from about 0.1:1 to about 1.5:1 of Li to $LiMn_2O_4$ and containing a weight ratio ranging from about 1:15 to about 3:7 of the material capable of acting as a host for Li intercalation to $LiMn_2O_4$. The resulting mixture of Li, $LiMn_2O_4$, and the material capable of acting as a host for Li intercalation is heated at a temperature of at least about 170° C. but no more than about 400° C. for a period of time effective to produce spinel $Li_2Mn_2O_4$.

It should be noted that the presence of the material capable of acting as a host for lithium intercalation is critical in the reaction described above. That is, a solid state reaction between Li and $LiMn_2O_4$ in the absence of the material capable of acting as a host for Li intercalation does not produce the desired spinel $Li_2Mn_2O_4$.

An object of the present invention is to provide an improved method of producing spinel $Li_2Mn_2O_4$.

Another object of the present invention while achieving the before stated object, is to provide a method of producing spinel $Li_2Mn_2O_4$ without the use of solvents.

Other objects, features and advantages of the present invention are apparent from the following detailed description when read in conjunction with the accompanying drawings and appended claims.

BRIEF DESCRIPTION OF THE DRAWINGS

FIG. 1 is a cross-sectional, fragmental, schematic representation of the crystalline structure of a rechargeable lithium battery cell.

FIG. 2 is a flow chart illustrating a method of producing spinel $Li_2Mn_2O_4$ from Li, $LiMn_2O_4$ and a material capable of acting as a host for Li intercalation in accordance with the present invention.

FIG. 6 is a chart illustrating the Raman spectra of the resulting products produced by heating a mixture of Li, Lonza graphite and $LiMn_2O_4$ at temperatures between 170° C. and 400° C.

FIG. 7 is a chart illustrating the Raman spectra of the resulting product produced by reacting Li and $LiMn_2O_4$ with (A) Lonza graphite at 10% by weight, (B) carbon (Super S) at 30% by weight, and (C) Li/$LiMn_2O_4$ molar ratio at 1.5:1 with Lonza graphite/$LiMn_2O_4$ weight ratio at 1:9.

DETAILED DESCRIPTION

Figure 3:
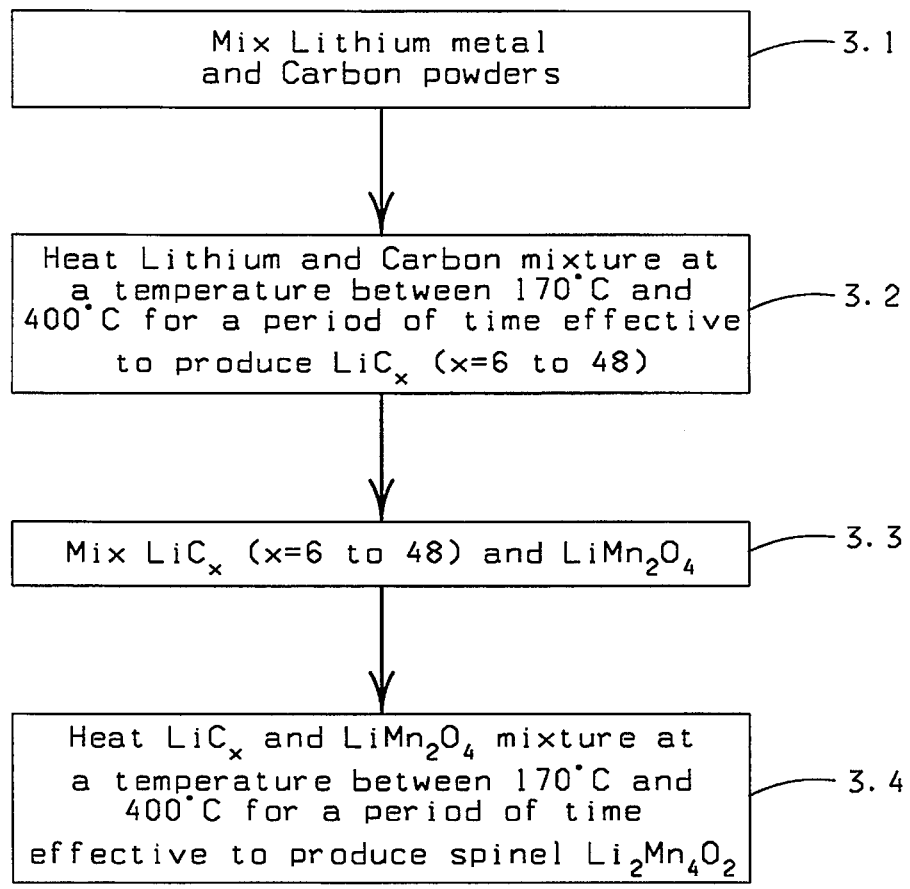
FIG. 3 is a flow chart illustrating a method of producing spinel $Li_2Mn_2O_4$ from Li, Lonza graphite and $LiMn_2O_4$ by first producing lithiated carbon of the formula $LiC_x$, wherein x ranges between about 6 to about 48.

Referring to the drawings in general, and to FIG. 1 in particular, shown therein and designated by the general reference numeral 10 is a rechargeable lithium battery cell.

The battery cell 10 includes a carbon anode 12, an electrolyte 14 and a composite cathode 16 fabricated of spinel $Li_2Mn_2O_4$.

The carbon anode 12 of the rechargeable lithium battery cell 10 is provided with a crystalline structure having a carbon framework 18. In a similar fashion, the cathode 16 of the rechargeable lithium battery cell 10 is provided with a crystalline structure having an $Mn_2O_4$ framework 20 defining a plurality of open channels therebetween. One of the open channels is designated in FIG. 1 by the reference numeral 21 and is generally representative of the open channels of the cathode 16.

The electrolyte 14 is typically an electrolyte solution produced by mixing effective amounts of ethylene carbonate, and dimethyl carbonate to form a solution containing a 1:1 weight ratio of ethylene carbonate to dimethyl carbonate. Then, an effective amount of lithium perchlorate is dissolved in the solution of ethylene carbonate and dimethyl carbonate to form the electrolyte solution having a molar ratio of 1:1 of lithium perchlorate to the solution of ethylene carbonate and dimethyl carbonate.

During the charring cycle of the battery cell 10, manganese begins to oxidize and $Li^+$ ions are shuttled from the cathode 16 to the carbon anode 12 and intercalated therein to form $Li_xC_6$ wherein x ranges from about 0 to about 2. In FIG. 1, the intercalation of the $Li^+$ ions during the charging cycle is indicated by the dashed circles, such as the one designated by the reference numeral 22.

During the discharging cycle of the battery cell 10, $Li^+$ ions intercalate in the opposite direction, i.e. from the carbon anode 12 to the spinel $Li_2Mn_2O_4$ cathode 16 and the manganese begins to reduce. In FIG. 1, the intercalation of the $Li^+$ ions during the discharging cycle of the battery cell 10 is illustrated by solid circles, such as the one designated by the reference numeral 24.

Methods for producing Li based composition batteries, such as the battery cell 10, are well known in the prior art. For example, a method for producing a Li based composition battery is disclosed in U.S. Pat. No. 5,196,279 issued to Tarascon. Thus, no further explanation is deemed necessary to teach one skilled in the art to produce a Li based composition battery, such as the battery cell 10.

Referring to FIG. 2, broadly, spinel $Li_2Mn_2O_4$ can be produced by mixing effective amounts of Li, $LiMn_2O_4$, and a material capable of acting as a host for lithium intercalation at ambient conditions to form a mixture containing a molar ratio ranging from about 0.1:1 to about 1.5:1 of Li to $LiMn_2O_4$ and containing a weight ratio ranging from about 1:15 to about 3:7 of the material capable of acting as a host for Li intercalation to $LiMn_2O_4$ (FIG. 2, block 2.1). The resulting mixture of Li, $LiMn_2O_4$, and the material capable of acting as a host for Li intercalation is heated at a temperature of at least about 170° C. but no more than about 400° C. for a period of time effective to produce spinel $Li_2Mn_2O_4$ (FIG. 2, block 2.2).

The term "material capable of acting as a host for Li intercalation", as used herein, refers to any material which will function as a host for Li intercalation and which will not produce any adverse effects in the production of spinel $Li_2Mn_2O_4$ by the methods disclosed herein. Examples of materials which will function as a "material capable of acting as a host for Li intercalation" are carbons, such as Lonza graphite and carbon (Super S).

The term "period of time effective to produce spinel $Li_2Mn_2O_4$", as used herein, refers to a period of time which can vary widely and any period of time effective to produce spinel $Li_2Mn_2O_4$ can be utilized in the practice of the present invention. Typically, however, the "period of time effective to produce spinel $Li_2Mn_2O_4$" typically ranges between about 12 hours to about 96 hours, and desirably ranges between about 40 hours to about 60 hours, and more desirably ranges between about 46 hours to about 50 hours.

Another method for producing spinel $Li_2Mn_2O_4$ is to mix effective amounts of Li and carbon to form a mixture containing a molar ratio ranging between about 1:84 to about 1:4 of Li to carbon (FIG. 3, block 3.1). The mixture of Li and carbon is then heated at a temperature of at least about 170° C., but not more than about 400° C. for a period of time effective to produce $LiC_x$, wherein x ranges between about 6 to about 48 (FIG. 3, block 3.2). Effective amounts of $LiC_x$, and $LiMn_2O_4$ are then mixed together to form a mixture containing a molar ratio ranging between 0.1:1 to about 1.5:1 of $LiC_x$ to $LiMn_2O_4$ (FIG. 3, block 3.3) and the mixture of $LiC_x$ and $LiMn_2O_4$ is then heated to at least about 170° C., but not more than about 400° C. for a period of time effective to produce spinel $Li_2Mn_2O_4$, as hereinbefore defined (FIG. 3, block 3.4).

The term "carbon", as used herein, refers to any carbon which will function as a host for Li intercalation and which will not produce any adverse effects in the production of spinel $Li_2Mn_2O_4$ by the methods disclosed herein. Examples of carbons which will function as a "carbon", as used herein, are Lonza graphite and carbon (Super S).

The term "a period of time effective to produce $LiC_x$", as used herein, refers to a period of time which can vary widely and any period of time effective to produce $LiC_x$ can be utilized in the practice of the present invention. Typically, however, the "period of time effective to produce $LiC_x$" ranges between about 12 hours to about 96 hours, and desirably ranges between about 40 hours to about 60 hours, and more desirably ranges between about 46 hours to about 50 hours.

Figure 4:
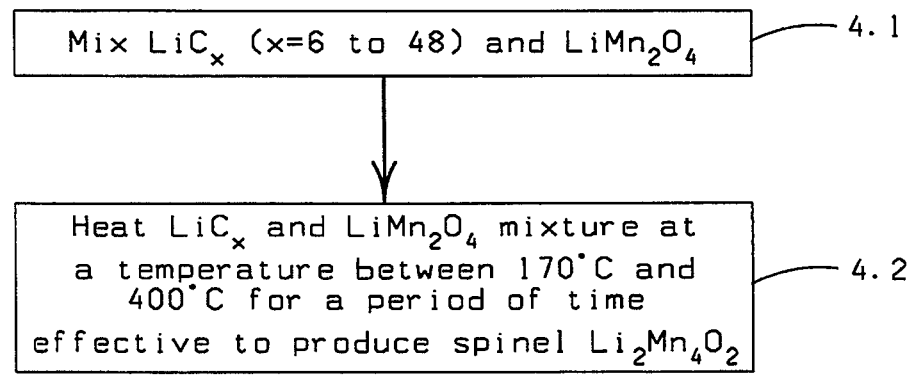
FIG. 4 is a flow chart illustrating a method of producing spinel $Li_2Mn_2O_4$ from $LiC_x$ wherein x ranges between about 6 to about 48, and $LiMn_2O_4$.
Figure 4:
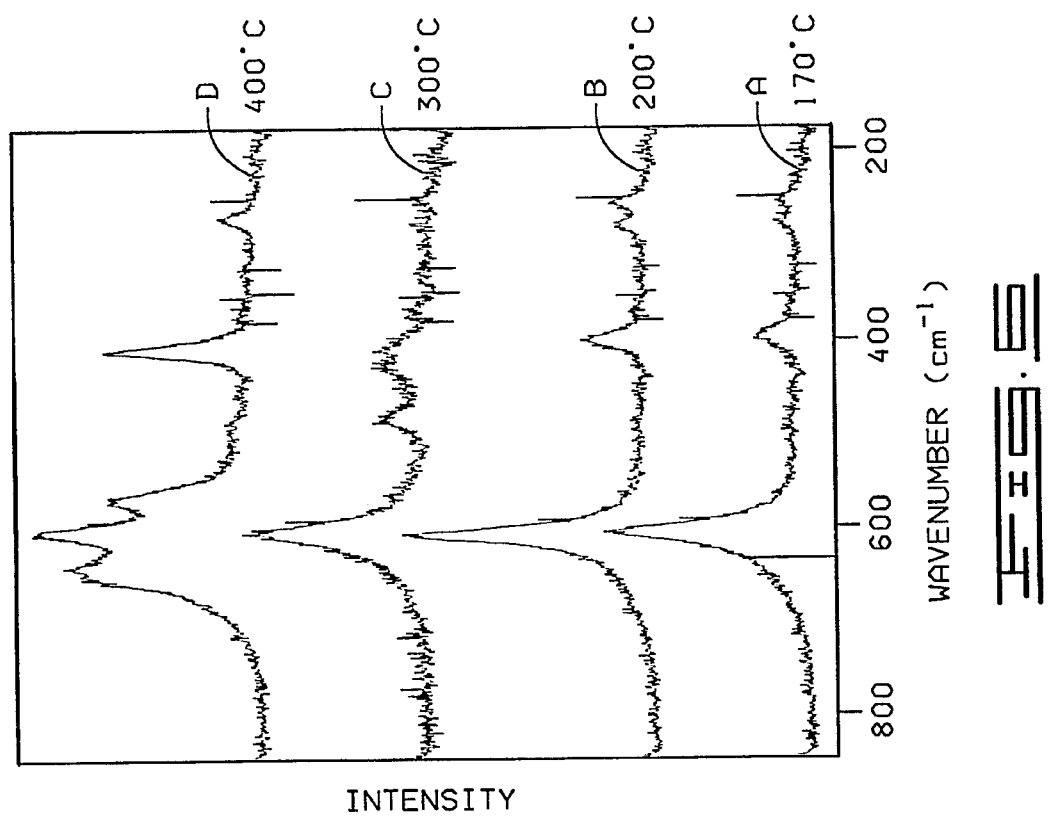

Yet another method for producing spinel $Li_2Mn_2O_4$ is to mix effective amounts of $LiC_x$ and $LiMn_2O_4$ to form a mixture containing a molar ratio ranging between 0.1:1 to about 1.5:1 of $LiC_x$ to $LiMn_2O_4$ (FIG. 4, block 4.1). The mixture of $LiC_x$ and $LiMn_2O_4$ is then heated to at least about 170° C., but not more than about 400° C. for a period of time effective to produce spinel $Li_2Mn_2O_4$, as hereinbefore defined (FIG. 4, block 4.2).

In order to more fully describe the methods recited above for producing spinel $Li_2Mn_2O_4$ the following examples are set forth. However, it is to be understood that the examples are for illustrative purposes only and are not to be considered as limiting the present invention as recited in the appended claims.

EXAMPLE 1

Spinel $Li_2Mn_2O_4$ was produced in accordance with the present invention as follows. Black $LiMn_2O_4$, Li metal and Lonza graphite powders were mixed together at ambient conditions to form a mixture containing a molar ratio of 1:1 of Li to $LiMn_2O_4$ and a weight ratio of 1:9 of Lonza graphite to $LiMn_2O_4$. Samples of the mixture of $LiMn_2O_4$, Li and Lonza graphite were then heated in a sealed stainless steel reactor at 170° C. for 96 hours; at 200° C. for 48 hours; at 300° C. for 48 hours; and at 400° C. for 48 hours.

Each of the samples produced by the method recited above was then examined under a Raman microscope and an X-ray diffractometer. The samples prepared at 170° C. (below the 186° C. melting point of Li) and 200° C. showed some light-brown regions having Raman spectra with four bands centered at 608, 400, 279 and 254 cm$^{-1}$ (curves A and B of FIG. 6). These Raman spectra are the same as those observed for spinel $Li_2Mn_2O_4$ produced from LiI and $LiMn_2O_4$ in acetonitrile solvent at 82° C., with a molar ratio of LiI to $LiMn_2O_4$ of 6:1 (curve A of FIG. 8).

The Raman spectrum of the sample prepared at 300° C. (curve C of FIG. 6) demonstrated mainly the same features of the spinel $Li_2Mn_2O_4$ produced in accordance with the teachings of Tarascon. However, in addition to the features of spinel $Li_2Mn_2O_4$, two weak impurity bands appear at 484 and 425 cm$^{-1}$ (curve C of FIG. 6).

The Raman spectrum of the sample prepared at 400° C. (curve D of FIG. 6), did not show obvious spinel $Li_2Mn_2O_4$ bands. Thus, it was concluded that spinel $Li_2Mn_2O_4$ can best be prepared by this method in a temperature range varying between about 170° C. to 300° C.

Figure 9:
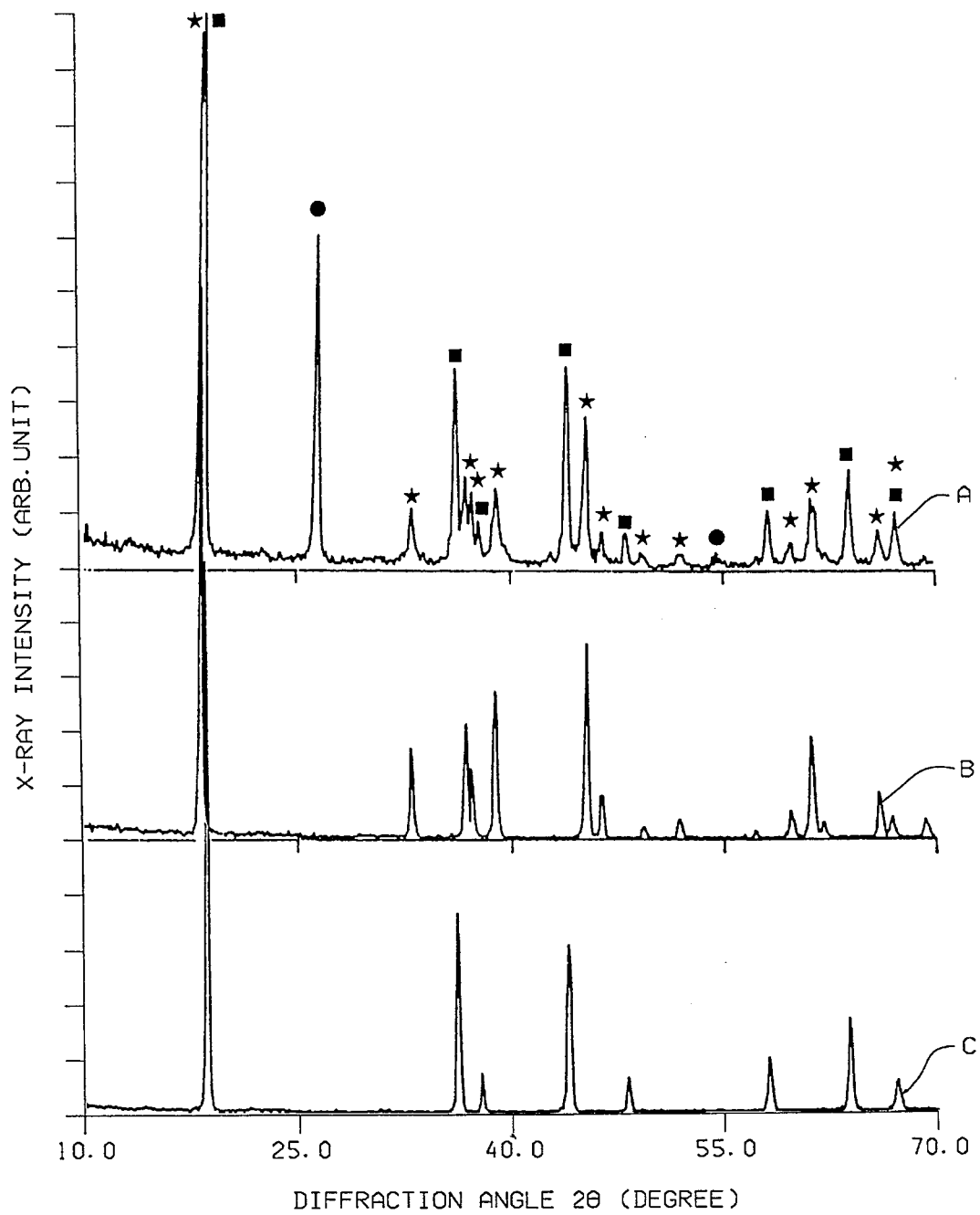
FIG. 9 is a chart illustrating the X-ray diffraction data of (A) spinel $Li_2Mn_2O_4$ prepared by reacting $LiMn_2O_4$, Li and Lonza graphite at 200° C., (B) spinal $Li_2Mn_2O_4$ prepared by reacting $LiMn_2O_4$ and LiI in an acetonitrile solution at 80° C., and (C) $LiMn_2O_4$ prepared from reacting $MnO_2$ and $Li_2CO_3$ in air at 800° C.

Curve A of FIG. 9 is the X-ray diffraction data for the sample prepared at 200° C. Also shown in FIG. 9 is X-ray diffraction data of spinel $Li_2Mn_2O_4$ prepared from reacting $LiMn_2O_4$ and LiI in acetonitrile solution at 80° C. (curve B) and X-ray diffraction data of $LiMn_2O_4$ prepared from $MnO_2$ and $Li_2CO_3$ in air at 800° C. (curve C).

Figure 5:
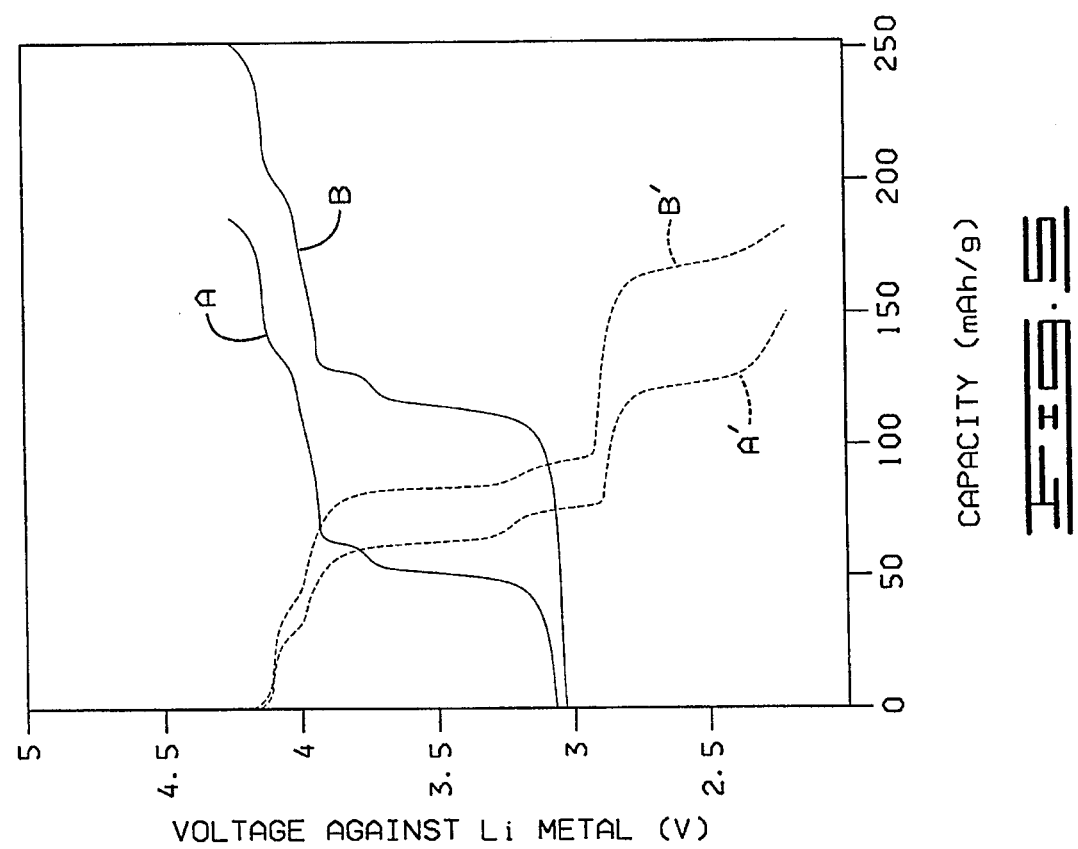
FIG. 5 is a chart illustrating the charge curves (solid lines) and discharge curves (dashed lines) of spinel $Li_2Mn_2O_4$ prepared from reacting (A) $LiMn_2O_4$, Li and Lonza graphite at 200° C., (B) $LiMn_2O_4$ and LiI in acetonitrile solution at 80° C.

A battery, such as the rechargeable lithium battery cell 10, was constructed such that the cathode 16 of the battery was fabricated of the spinel $Li_2Mn_2O_4$ prepared at 200° C. Curve A of FIG. 5 is the charge curve and curve A' is the discharge curve of such battery. Curve B of FIG. 5 is the charge curve and curve B' is the discharge curve of the rechargeable lithium battery cell 10 having the composite cathode 16 fabricated of spinel $Li_2Mn_2O_4$ prepared by reacting $LiMn_2O_4$ and LiI in acetonitrile solution at 80° C.

EXAMPLE 2

Black $LiMn_2O_4$, Li metal and carbon (Super S) powders were mixed together at ambient conditions to form a first mixture containing a molar ratio of 1:1 of Li to $LiMn_2O_4$ and a carbon (Super S) content of 10 wt %. The first mixture was then heated in a sealed stainless steel reactor at 200° C. for 48 hours. Although the Raman spectrum of the first mixture (curve B of FIG. 7) did not show obvious spinel $Li_2Mn_2O_4$ bands, X-ray diffraction data (not shown) indicated the presence of spinel $Li_2Mn_2O_4$.

A second mixture of black $LiMn_2O_4$, Li metal and carbon (Super S) powders was mixed together at ambient conditions. The second mixture contained a molar ratio of 1:1 of Li to $LiMn_2O_4$ and a carbon (Super S) content of 30 wt %. The second mixture of $LiMn_2O_4$, Li metal and carbon (Super S) was heated in a sealed stainless steel reactor at 200° C. for 48 hours.

The Raman spectrum of the second mixture was the same as the Raman spectrum of the first mixture and thus, did not show obvious spinel $Li_2Mn_2O_4$ bands. It was concluded that spinel $Li_2Mn_2O_4$ is produced in very small yields when carbon (Super S) was used for the material capable of acting as a host for Li intercalation.

EXAMPLE 3

Black $LiMn_2O_4$, metal and Lonza graphite powders were mixed together at ambient conditions to form a mixture containing a molar ratio of 1.5:1 of to $LiMn_2O_4$ and a weight ratio of 1:9 of Lonza graphite to $LiMn_2O_4$. The mixture of $LiMn_2O_4$, Li and Lonza graphite was then heated in a sealed stainless steel reactor at 200° C. for 48 hours.

As illustrated curve C of FIG. 7, some impurity phases were present in the corresponding Raman spectrum of the spinel $Li_2Mn_2O_4$ produced from such mixture. Thus, it was concluded that a 1:1 molar ratio is preferred over a 1.5:1 molar ratio of Li to $LiMn_2O_4$.

EXAMPLE 4

Black $LiMn_2O_4$, Li metal and Lonza graphite powders were mixed together at ambient conditions to form a mixture containing a molar ratio of 1:1 of Li to $LiMn_2O_4$ and a weight ratio of 3:7 of Lonza graphite to $LiMn_2O_4$. The mixture of $LiMn_2O_4$, Li and Lonza graphite was then heated in a sealed stainless steel reactor at 200° C. for 48 hours.

X-ray diffraction data (not shown) revealed that the 3:7 Lonza graphite/$LiMn_2O_4$ ratio yielded less spinel $Li_2Mn_2O_4$ than the 1:9 Lonza graphite/$LiMn_2O_4$ ratio. Thus, it was concluded that a 1:9 ratio of Lonza graphite to $LiMn_2O_4$ is preferred over a 3:7 ratio.

EXAMPLE 5

Li metal and Lonza graphite powders were mixed at ambient conditions to form a mixture containing a molar ratio of 1:6 of Li to Lonza graphite. Then, the mixture of Li and Lonza graphite was heated at a temperature of 200° C. for 48 hours to produce $LiC_6$.

The $LiC_6$ produced from the Li metal and Lonza graphite powders was mixed with $LiMn_2O_4$ at ambient conditions by use of a pestle and mortar in a glove box filled with ultrahigh pure argon gas to form a mixture containing a molar ratio of 1:1 $LiC_6$ to $LiMn_2O_4$. The mixture of $LiC_6$ and $LiMn_2O_4$ was then sealed in a stainless steel reactor and heated at 200° C. for 48 hours to produce spinel $Li_2Mn_2O_4$.

Figures 8, 9A:
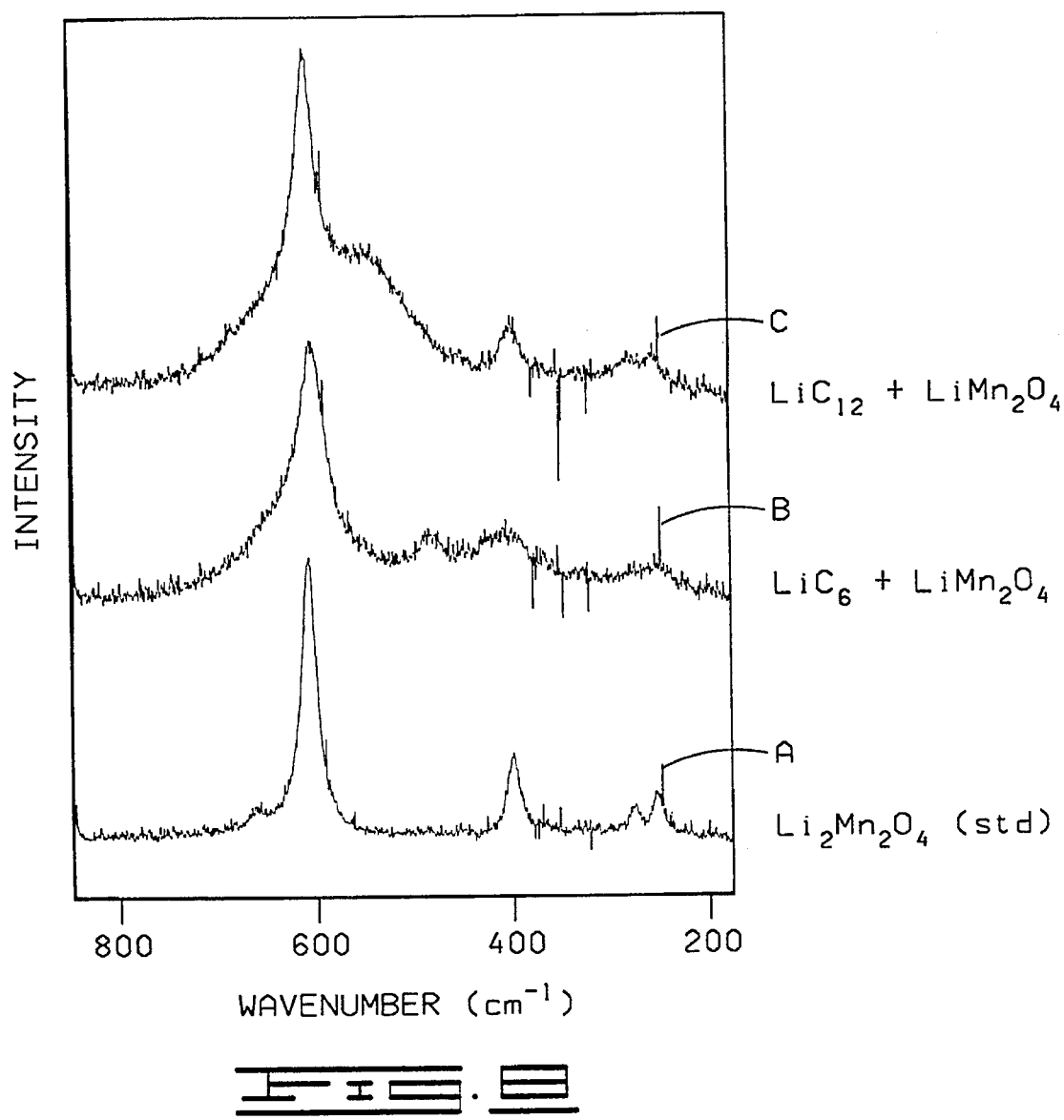
FIG. 8 is a chart illustrating the Raman spectra of spinel $Li_2Mn_2O_4$ prepared by reacting (A) $LiC_{12}$ and $LiMn_2O_4$, (B) $LiC_6$ and $LiMn_2O_4$, and (C) LiI and $LiMn_2O_4$ in acetonitrile solvent.
FIG. 9A is a legend for the chart of FIG. 9.

Referring to FIG. 8, curve A is the Raman spectrum for standard spinel $Li_2Mn_2O_4$. Curve B is a Raman spectra for products formed from reacting $LiC_6$ with $LiMn_2O_4$. A comparison of curves A and B shows that spinel $Li_2Mn_2O_4$ is produced from reacting $LiC_6$ with $LiMn_2O_4$.

EXAMPLE 6

Li metal and Lonza graphite powders were mixed at ambient conditions to form a mixture containing a molar ratio of 1:12 of Li to Lonza graphite. Then, the mixture of Li and Lonza graphite was heated at a temperature of 200° C. for 48 hours to produce $LiC_{12}$.

The $LiC_{12}$ produced from the Li metal and Lonza graphite powders was mixed with $LiMn_2O_4$ at ambient conditions by use of a pestle and mortar in a glove box filled with ultrahigh pure argon gas to form a mixture containing a molar ratio of 1:1 $LiC_{12}$ to $LiMn_2O_4$. The mixture of $LiC_{12}$ and $LiMn_2O_4$ was then sealed in a stainless steel reactor and heated at 200° C. for 48 hours to produce spinel $Li_2Mn_2O_4$.

Referring to FIG. 8, curve A is the Raman spectrum for standard spinel $Li_2Mn_2O_4$. Curve c is the Raman spectra for products formed from reacting $LiC_{12}$ with $LiMn_2O_4$. A comparison of curves A and C shows that spinel $Li_2Mn_2O_4$ is produced from reacting $LiC_{12}$ with $LiMn_2O_4$.

It should be appreciated that the laboratory procedures disclosed hereinabove may be adapted to commercial production of spinel $Li_2Mn_2O_4$. Further, it is well within the scope of the present invention that the methods disclosed herein may be modified by the application of the wide variety of commercial production techniques which are known in the art.

Changes may be made in the combinations, operations and arrangements of the various parts and elements described herein without departing from the spirit and scope of the invention as defined in the following claims.

What is claimed is:

1. A method for producing spinel $Li_2Mn_2O_4$ comprising the steps of:
   (a) mixing effective amounts of Li metal, $LiMn_2O_4$ and a material capable of acting as a host for Li intercalation to form a mixture containing a molar ratio ranging from about 0.1:1 to about 1.5:1 of Li metal to $LiMn_2O_4$ and containing a weight ratio ranging from about 1:15 to about 3:7 of the material capable of acting as a host for Li intercalation to $LiMn_2O_4$; and
   (b) heating the mixture of Li metal, $LiMn_2O_4$ and the material capable of acting as a host for lithium intercalation at a temperature of at least about 170° C., but not more than about 400° C. for a period of time effective to produce spinel $Li_2Mn_2O_4$.

2. The method of claim 1 wherein the material capable of acting as a host for Li intercalation is a carbon.

3. The method of claim 1 wherein the mixture of Li metal, $LiMn_2O_4$ and the material capable of acting as a host for Li contains a molar ratio of about 1:1 of Li metal to $LiMn_2O_4$.

4. The method of claim 1 wherein the material capable of acting as a host for Li intercalation is a carbon and wherein the mixture of Li metal, $LiMn_2O_4$ and the carbon contains a weight ratio of about 1:9 of the carbon to $LiMn_2O_4$.

5. The method of claim 1 wherein the mixture of Li metal, $LiMn_2O_4$ and the material capable of acting as a host for Li intercalation is heated at a temperature of about 200° C. and wherein the period of time effective to produce spinel $Li_2Mn_2O_4$ is about 48 hours.

6. The method of claim 1 wherein the material capable of acting as a host for Li intercalation is Lonza graphite and wherein the mixture of Li metal, $LiMn_2O_4$ and Lonza graphite contains a molar ratio of about 1:1 of Li metal to $LiMn_2O_4$ and a weight ratio of about 1:9 of Lonza graphite to $LiMn_2O_4$ and wherein the mixture of Li metal, $LiMn_2O_4$ and Lonza graphite is heated at a temperature of about 200° C. and wherein the period of time effective to produce spinel $Li_2Mn_2O_4$ is about 48 hours.

7. A method for producing spinel $Li_2Mn_2O_4$ comprising the steps of:
   (a) mixing effective amounts of Li metal, and a carbon to form a mixture containing a molar ratio ranging between about 1:84 to about 1:4 of Li to carbon;
   (b) heating the mixture of Li metal and the carbon at a temperature between about 170° C. and 400° C. for a period of time effective to produce $LiC_x$, wherein x ranges between about 6 to about 48;
   (c) mixing effective amounts of $LiC_x$ and $LiMn_2O_4$ to form a mixture containing a molar ratio ranging between 0.1:1 to about 1.5:1 of $LiC_x$ to $LiMn_2O_4$; and
   (d) heating the mixture of $LiMn_2O_4$ and $LiC_x$ to a temperature between about 170° C. to about 400° C. for a period of time effective to produce spinel $Li_2Mn_2O_4$.

8. The method of claim 7 wherein the carbon is Lonza graphite.

9. The method of claim 7 wherein the mixture of Li metal and carbon is heated at a temperature of about 200° C. and wherein the period of time effective to produce $LiC_x$ is about 48 hours.

10. The method of claim 7 wherein the carbon is Lonza graphite and wherein the mixture of Li metal and Lonza graphite contains a molar ratio of 1:6 of Li to Lonza graphite.

11. The method of claim 7 wherein the mixture of $LiC_x$ and $LiMn_2O_4$ contains a molar ratio of about 1:1 of $LiC_x$ to $LiMn_2O_4$.

12. The method of claim 7 wherein the mixture of $LiC_x$ and $LiMn_2O_4$ contains a molar ratio of about 1:1 of $LiC_x$ to $LiMn_2O_4$ and wherein the mixture of $LiC_x$ and $LiMn_2O_4$ is heated to a temperature of about 200° C. and wherein the period of time effective to produce spinel $Li_2Mn_2O_4$ is about 48 hours.

13. The method of claim 7 wherein the carbon is Lonza graphite and wherein the mixture of Li metal and Lonza graphite contains a molar ratio of about 1:6 of Li metal to Lonza graphite and wherein the mixture of Li metal and carbon is heated at a temperature of about 200° C. and wherein the period of time effective to produce $LiC_x$ is about 48 hours and wherein the mixture of $LiC_x$ and $LiMn_2O_4$ contains a molar ratio of about 1:1 of $LiC_x$ to $LiMn_2O_4$ and wherein the mixture of $LiC_x$ and $LiMn_2O_4$ is heated to a temperature of about 200° C. and wherein the period of time effective to produce spinel $Li_2MnO_4$ is about 48 hours.

14. A method for producing spinel $Li_2Mn_2O_4$ comprising the steps of:
   (a) mixing effective amounts of $LiC_x$, wherein x ranges between about 6 to about 48, and $LiMn_2O_4$ to form a mixture containing a molar ratio ranging between 0.1:1 to about 1.5:1 of $LiC_x$ to $LiMn_2O_4$; and
   (b) heating the mixture of $LiMn_2O_4$ and $LiC_x$ to a temperature between about 170° C. to about 400° C. for a period of time effective to produce spinel $Li_2Mn_2O_4$.

15. The method of claim 14 wherein the mixture of $LiC_x$ and $LiMn_2O_4$ contains a molar ratio of about 1:1 of $LiC_x$ to $LiMn_2O_4$.

16. The method of claim 14 wherein the mixture of $LiC_x$ and $LiMn_2O_4$ contains a molar ratio of about 1:1 of $LiC_x$ to $LiMn_2O_4$ and wherein the mixture of $LiC_x$ and $LiMn_2O_4$ is heated to a temperature of about 200° C. and wherein the period of time effective to produce spinel $Li_2Mn_2O_4$ is about 48 hours.

17. The method of claim 14 wherein the mixture of $LiC_x$ and $LiMn_2O_4$ is heated to a temperature of about 200° C. and wherein the period of time effective to produce spinel $Li_2Mn_2O_4$ is about 48 hours.

* * * * *